April 25, 1961 L. C. BRISSON 2,981,378
SERVO TYPE BRAKE WITH SELF REGULATION
Filed Sept. 11, 1957 3 Sheets-Sheet 1

INVENTOR
LOUIS C. BRISSON
BY
Mitchell Bechert
ATTORNEYS

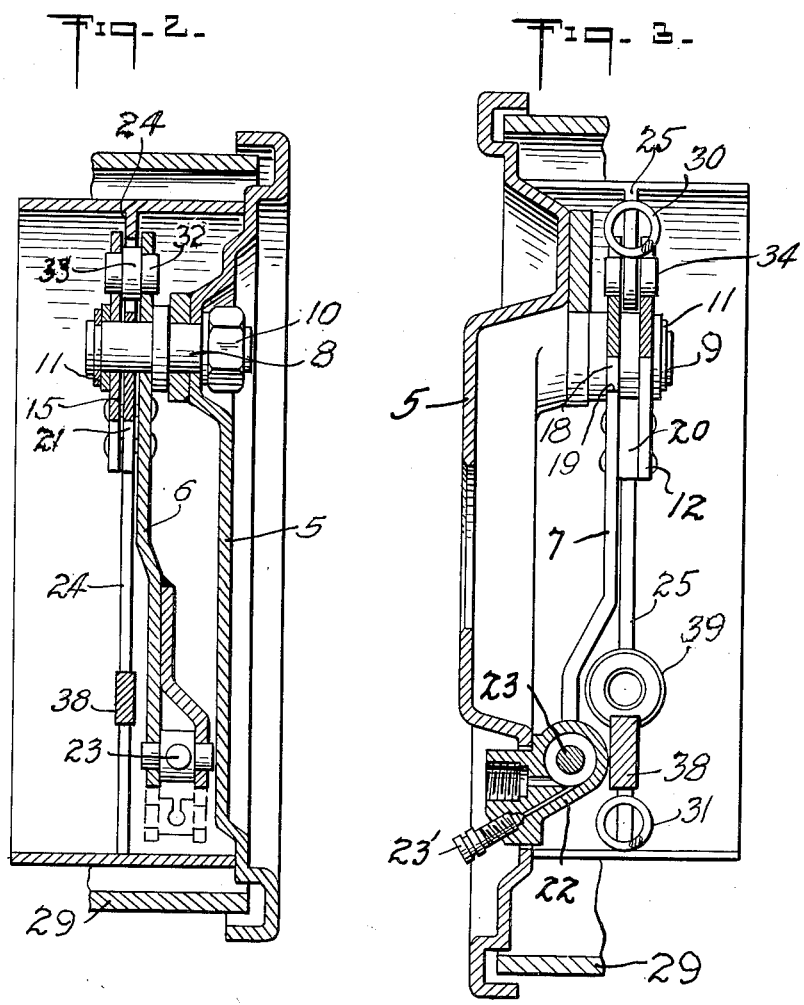

April 25, 1961 L. C. BRISSON 2,981,378
SERVO TYPE BRAKE WITH SELF REGULATION
Filed Sept. 11, 1957 3 Sheets-Sheet 3

INVENTOR
LOUIS C. BRISSON
BY
Mitchell & Bechert
ATTORNEY

United States Patent Office
2,981,378
Patented Apr. 25, 1961

2,981,378

SERVO TYPE BRAKE WITH SELF REGULATION

Louis C. Brisson, Le Vieux Logis, Vinevil St. Firman, Oise, France

Filed Sept. 11, 1957, Ser. No. 683,262

11 Claims. (Cl. 188—78)

My invention relates to a brake, principally for motor vehicles.

The brake, in the preferred form, is of the type often referred to as a self-energizing brake, involving a pair of brake shoes within a drum, together with means for urging the shoes into engagement with the drum for braking purposes. Such floating shoes in a self-energizing brake, while giving good braking power, are apt to be somewhat irregular in action and not respond properly to the foot or other applied force of the operator. Such brakes at times may stick so as to be unsatisfactory as brakes.

It is an object of the invention, therefore, to provide an improved brake of the self-energizing type, which will be quite regular in action and reliable.

Another object is to provide a brake of the character indicated, which is relatively simple in construction, which may be operated either mechanically or hydraulically, and which will respond properly to the pressure applied by the operator.

Another object is to provide an exceedingly simple mechanical brake of the character indicated, which will produce results not heretofore possible in mechanical brakes of the type indicated.

Other objects and various features of novelty and invention will be pointed out or will become apparent to those skilled in the art.

Briefly stated, in a preferred form of the invention I employ a pair of levers pivotally connected at spaced apart points to a brake plate. These levers are connected, preferably by pin and slot pivotal connections, to a pair of brake shoes which are urged by said levers into engagement with the usual brake drum. The shoes are preferably normally urged toward each other by spring means in the usual fashion. The shoes are linked together by a compression link secured thereto, the effective distance of said link from the center of the drum being not more than about 0.5 the radius of the drum. The levers are rocked by hydraulic or mechanical means, which permit the same to float, and such action of the levers urges the shoes into engagement with the brake drum. There is a differential action on the two shoes, due to the direction of rotation of the drum and the friction between the shoes and the drum. The shoes are so interconnected, preferably through the levers and other connecting parts in such a way that one of the shoes is urged in a direction away from contact with the drum upon the application of a high reaction pressure between the drum and the other shoe. In such manner, the brake is rendered regular in its action and responds properly to the operator pressure, tending to rock the links on their pivots. In the form shown, the connections between shoes preferably consists of extension lever arms on the levers extending across one to the other so that each extension arm has contact with and lever action upon the other lever. Thus, rotation of one lever in one direction tends to rotate the other lever, due to the engagement of the extension lever arm and the abutment which it contacts.

In the drawings which show, for illustrative purposes only, a preferred form of the invention Fig. 1 is an axial view of the brake, the drum being fragmentarily shown and for the most part omitted to make clear the constructions ordinarily associated with the drum;

Fig. 2 is a sectional view, taken substantially in the plane of the line 2—2 of Fig. 1, looking in the direction of the arrows;

Fig. 3 is a sectional view, taken substantially in the plane of the line 3—3 of Fig. 1, looking in the direction of the arrows.

In said drawings, there is a usual brake plate 5 of desired proper design, and on this brake plate are mounted two levers 6—7. These levers are pivotally mounted and, in the preferred form, are mounted on pins 8—9 rigidly secured to the brake plate or back plate 5 as by means of nuts 10, as shown in Fig. 2. The levers may be held on the pins as by means of the washers and split wire rings 11.

Figure 1:
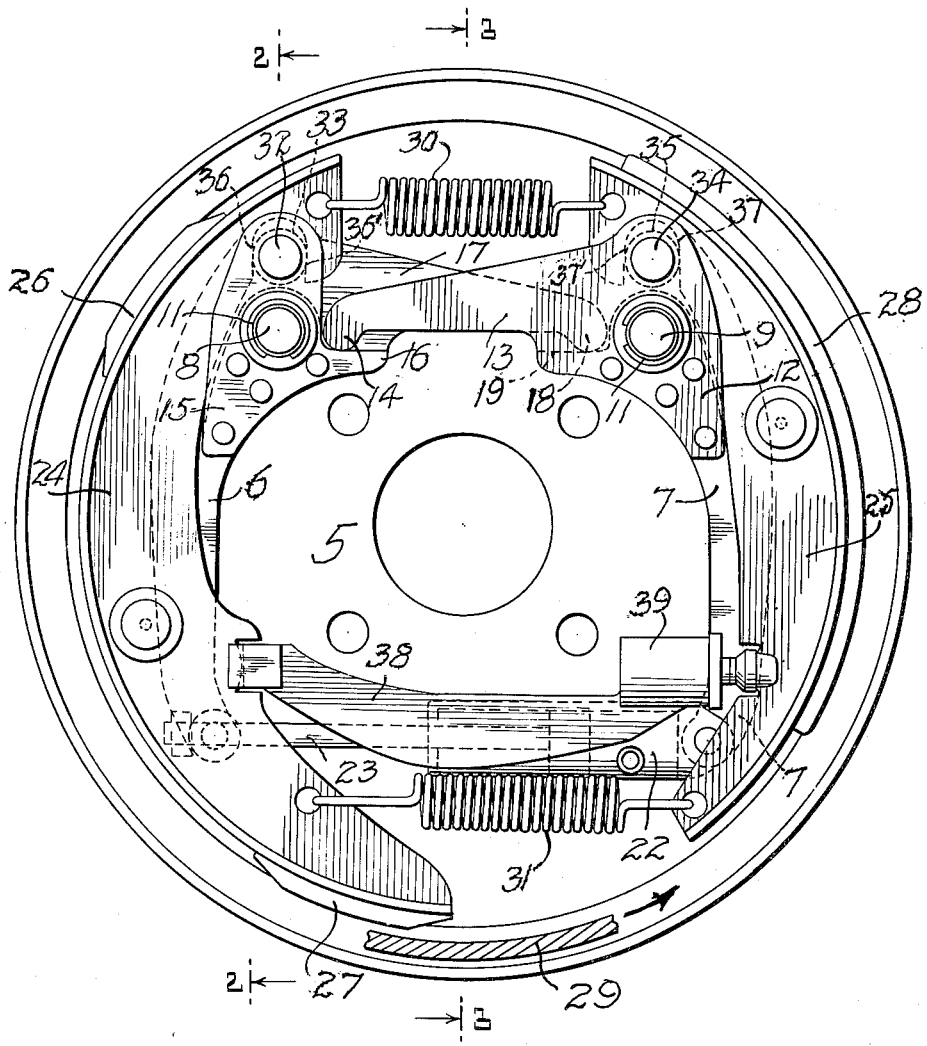

The levers are interconnected in such a way that rocking one of the levers about its pivot in one direction tends to rotate the other lever about its pivot in one direction. In the form illustrated, the lever 7 has an auxiliary plate or lever part 12 secured thereto and providing an extension lever arm 13, which has a lever end 14, as will be clear. The other lever 6 preferably has a lever plate 15 secured thereto, as by means of rivets, and this plate 15 has an abutment surface 16 for engagement by the lever end 14 on the lever 13, carried by the lever 7. The lever 6 has an extension lever arm 17, having an end 18, for engagement with an abutment surface 19 on the other lever 7. It will be seen that the two extension levers 13—17 are in different planes so that they may cross each other, as shown particularly in Fig. 1. The lever 7 and its attached auxiliary extension lever plate 12 may be separated as by means of a spacer plate 20 or the like, while the lever 6 and its auxiliary extension lever plate 15 may be spaced by a spacer 21.

The two levers at the bottom ends are connected together so as to rock the same about their pivots by any suitable means, but in the form shown I have illustrated a fluid-pressure cylinder 22 and a piston rod 23 having a piston in the cylinder 22. Thus, upon the application of pressure fluid through the connection 23' (Fig. 3) to the tail end of the piston, the two lower ends of the lever will be drawn toward each other.

The upper ends of the levers 6—7 are pivotally connected to a pair of brake shoes 24—25. In the form shown, these shoes are segmental in shape. The shoe 24 has friction brake surfaces 26—27 while the brake shoe 25 has a friction band 28. It might be here stated that the two shoes are normally urged toward each other and out of engagement with the brake drum 29 by tension springs 30—31, as will be understood. The pivotal connection between the upper ends of the levers 6—7 and the respective shoes 24—25 may be in the form of pivotal pin and slot connections. In the form illustrated, each of the levers, for example the lever 6 and its auxiliary lever or plate 15, carry a pin 32 between them and between the two lever parts the pin rotatably carries a bearing sleeve 33. The other lever 7 and its auxiliary lever or plate 12 carry a similar pin 34 and a bearing sleeve 35, both corresponding to the same parts shown particularly in Fig. 2. The web of the brake shoe 24 cooperates with the sleeve 33, and in the form shown the shoe web has an elongated notch or slot 36 extending into the same so as to provide a hook 36', which in effect hooks over the bearing sleeve 32. Thus, the shoe 24 is both pivotally and slidably connected to the lever 6, The shoe 25 has a similar slot or notch 37 defining a hook, which hooks over the bearing sleeve 35 the same as in the other case. Thus, rocking of the levers 6—7 will rock the shoes 24—25, as will be understood.

The shoes are linked together by a compression link 38, which is adjustable as to length as by means of an adjustment screw means 39. The effective line of the compression link 38, that is, the line joining the two points of connection between the link and the shoes, is preferably not distant from the center of the drum more than about 0.5 the radius of the drum, and in the form shown in Fig. 1 this distance is roughly 0.3 the radius of the drum.

The operation is substantially as follows:

The lower ends of the levers, which are floatingly mounted on the back plate, just as the shoes are floatingly mounted within the drum, are drawn together by means of the piston and cylinder means 22—23 or other means for coupling and drawing the levers together. By drawing the lever ends toward each other, the levers are rocked about their pivots 8—9 and through the pins 32—34 and the bearing sleeves 33—35 within the hook slots of the shoe webs, shoes are moved out into engagement with the inside of the drum 29. The effect of the rotating drum is different as between the two shoes. The shoe 24, which is considered the primary shoe when the drum rotates counterclockwise, that is, in the direction of the arrow, is urged by the rotation of the drum into tighter and tighter engagement therewith. The shoe 25 will be urged by a combination of the reaction pressures of the drum thereon and the forces thereon transmitted from the other shoe in a circumferential direction of movement with the drum. This differential action of the rotating drum on the two shoes acts through the pins 32—34 and their bearing sleeves 33—35 so as to tend to rock both levers in a counterclockwise direction. Since the shoes are floating and the levers are also floating, the drum reaction on the shoe 25 tends to increase, and any increase in that pressure is transmitted to the pin 34, which in turn tends to rock about its pivot 9. Such rocking of the lever 7 in a counterclockwise direction about its pivot 9 acts through the lever arm 13 and the extension lever end 14 to tend to rotate the lever 6 in a clockwise direction. Now the forces acting on the lever 6 essentially are three in number: 1, the initial force acting through the piston rod 23 tending to rotate the lever 6 in a counterblockwise direction; 2, the force of the extension lever arm 13 tending to rotate the lever 6 in a clockwise direction; and 3, the reaction pressure of the drum on the shoe 24, which acting through the pin 32 will be in a counterclockwise direction, so as to maintain the lever 6 in equilibrium. It should be noted that the forces acting on the shoe 24 are the forces transmitted through the pin 32, the reaction pressure through the compression link 38, and the drum reaction pressure on the shoe 24. It may be said that the position of the resultant drum reaction pressure on the shoe depends largely upon the coefficient of friction between the shoe 24 and the drum. With a normal or high coefficient of friction, the resultant drum reaction pressure on the shoe 24 acts to the right in a position below the line of the link 38. Thus, with that reaction pressure toward the right and the link reaction pressure toward the left, the pressure on the pin 32 must be to the right (i.e. clockwise about pin 8) to cause the shoe 24 to remain in equilibrium. Thus, depending upon the coefficient of friction between the shoe 24 and the drum, the forces acting on the lever 6 at the pin 32 may be clockwise or counterclockwise, as indicated above. Thus, the shoe 24 has a tendency to move to maintain the braking action uniform and not irregular as with the prior art devices of the same general character.

If the drum rotation should be in the opposite direction, the shoe 25 would become the primary shoe, and the shoe 24 would be the secondary shoe, and the actions would be reversed from that heretofore described. Therefore, no matter which way the drum rotates, the action of the brake will be substantially the same because the action of one shoe when the drum rotates in one direction will be the action of the other shoe when the drum rotates in the opposite direction.

It will be seen, then, that I have provided a brake which will be regular in its action and operate more smoothly and in accordance with the operator's foot pressure than prior-art brakes of the same general character.

Figure 4:
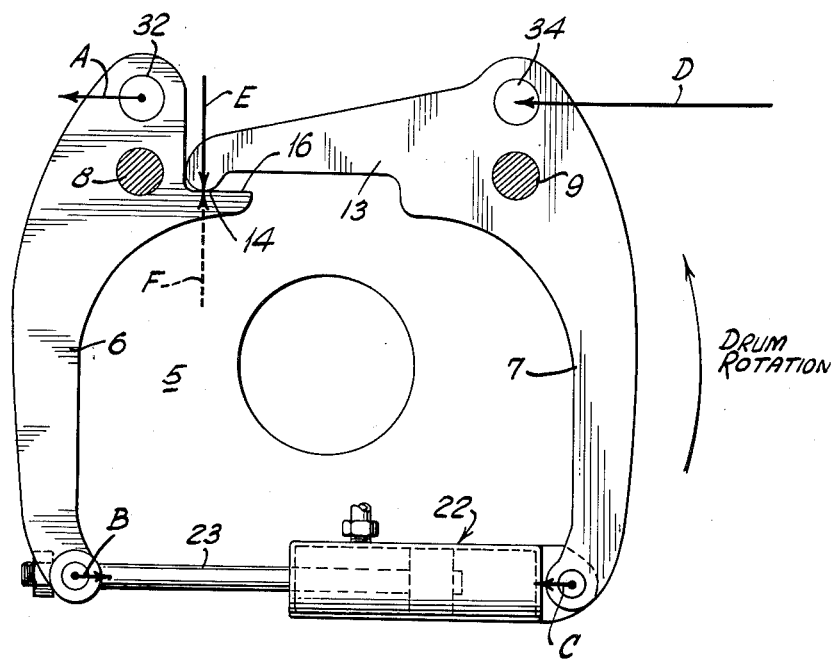
Fig. 4 is a simplified showing of lever portions which brake the drum rotation in a counterclockwise direction.

Fig. 4 is a simplified showing only of those parts of the levers 6—7 which are called into play in an employment of the brake to arrest drum rotation in the counterclockwise direction. The first force developed upon initially applying the brake is the compressional force designated B and C applied equally and oppositely to the lower end of the levers 6—7. This force begins to displace the lever 6 counterclockwise until initial frictional contact is developed between the primary shoe 24 and the drum. It has been explained previously that upon such initial contact, the nature of the primary shoe is to develop a self-energizing action whereby the shoe 24 tends immediately to seize upon the drum. Such seizure is evidenced by a full displacement of the shoe 24 in the direction of the drum ahead of that displacement which would have been attributed solely to movement of the actuating lever 6. In other words, because of the self-energizing action, a reaction force A develops between the shoe 24 and the pin 32. It will be noted that both the reaction force A and the actuating force B are both applied to the lever 6 and tend to rotate the lever 6 about its frame-based pivot 8 in the counterclockwise direction. If nothing else were done, self-energizing action would develop to lock the brake, with wholly undesirable and undoubtedly disastrous results in many instances.

Reference is made herein to my copending application, Ser. No. 651,477, filed April 8, 1957.

While the invention has been described in considerable detail and a preferred form illustrated, it is to be understood that various changes and modifications may be made within the scope of the invention as defined in the appended claims.

I claim:

1. In a brake, a brake plate, a pair of levers pivotally mounted thereon, a pair of brake shoes each pivotally connected to a different one of said levers, a brake drum surrounding said shoes, a compression link connection between said shoes, means for swinging said levers about their pivotal connections to said brake plate for urging said shoes into engagement with said drum, one of said levers having a lever arm extending therefrom and in engagement with the other of said levers at a point on the opposite side of the pivot for said other lever from the brake shoe connected therewith so that said last-mentioned lever is urged in one direction upon the application of a rotating force on the other lever in an opposite direction.

2. In a brake, a brake plate, a pair of levers pivotally mounted thereon, a pair of brake shoes each pivotally connected to a different one of said levers for movement thereby into engagement with a brake drum upon the rocking of said levers, a link connection between said shoes, means for moving the ends of said levers so as to rock the same as aforesaid, one of said levers having an abutment surface, the other of said levers having a substantially rigid arm extending therefrom and in engagement with said abutment surface for rotating said lever having said abutment surface in one direction about its pivotal axis upon the rotation of said other lever about its pivotal axis in the opposite direction.

3. In a brake, a brake plate, a pair of levers pivotally mounted thereon, a pair of shoes, each shoe being connected to a different one of said levers, means for rocking said levers so as to urge said shoes into engagement with a drum, a link connection between said shoes, each of said levers having an arm extending to the other of said levers, each of said levers having an abutment for engagement by each said extending arms, said arms and abutments being so located with respect to the lever pivots that rotation of one of said levers in one direction will tend to rotate the other of said levers in the opposite direction.

4. In a brake, a brake plate, a pair of levers pivotally connected thereto, a pair of shoes, each of said levers at one end having a pivotal connection with a different one of said shoes, means for drawing the other ends of said levers toward each other for swinging said levers about their pivotal axes and urging said shoes in the direction of of engagement with a drum, one of said levers having an abutment surface, the other of said levers having an extending lever arm engaging said abutment surface, whereby upon rotation of said lever having said lever arm in one direction, said other lever having said abutment surface will be urged thereby in another direction, whereby one of said brake shoes will be moved in a direction away from said brake drum.

5. In a brake, a brake plate, a pair of pins rigidly secured thereto at spaced apart points, a lever pivotally mounted on each of said pivot pins, a pair of brake shoes, each of said shoes being pivotally connected to a different one of said levers at one end thereof, means for drawing the other ends of said levers toward each other to urge said brake shoes into engagement with a brake drum, a compression link connecting said shoes, one of said levers having an extension lever arm engaging an abutment on the other of said levers, whereby said other of said levers will be rocked in one direction to move said brake shoe connected thereto relatively to the drum upon actuation of said first lever, having said lever arm, in the opposite direction.

6. In a brake, a brake plate, a pair of levers pivotally secured to said back plate at spaced apart points thereon, a pair of brake shoes, each of said brake shoes and levers having a pivotal pin-and-slot connection with a different one of said levers, a compression link connecting said brake shoes, the effective line of said compression link being spaced from the center of the brake drum a distance less than 0.5 the radius of the brake drum, means for drawing the other ends of said levers toward each other for swinging said levers about their pivotal axes and urging said brake shoes into engagement with a drum, each of said levers having an extending lever arm for engagement with an abutment surface on the other lever arm, whereby swinging of either one of said levers in one direction will cause the lever arm thereon to engage the abutment surface on the other lever, thereby tending to rock said other lever in the opposite direction and at the same time tending to move the brake shoe connected to said other lever, for the purpose of preventing locking with the brake drum.

7. Actuating means for driving brake shoes into engagement with a brake drum, comprising first means connected to spread the shoes apart in substantially radial motion, lever means including at least a pair of crossed-connected lever members whereby the apparatus is responsive to movement of one shoe in one circumferential direction and of the other shoe in the other circumferential direction, each of said lever means comprising a bellcrank having a fixed pivot, means to connect one arm of one bellcrank lever to one of said shoes, means to connect the corresponding arm of the other bellcrank lever to the other of said shoes, abutment shoulders on each of said levers, the other arm of said one lever engaging the abutment shoulder of the other, and the other arm of the other lever engaging the abutment shoulder of said one lever, whereby circumferential movement of one shoe rocks one lever in one direction to cause the other lever to be rocked in the opposite direction to apply force to the other shoe in a direction inwardly away from the drum.

8. In a brake, a pair of brake shoes to engage a brake drum, first and second levers mounted pivotally at spaced apart points, means to connect one of said pair of brake shoes to said first lever, means to connect the other of said pair of brake shoes to said other lever, actuable means connected to said first and said second levers to pivot said levers relative to each other about their respective pivotal mountings to move said pair of brake shoes into engagement with a brake drum, a compression link between said pair of brake shoes, an abutment surface on said first lever in a plane so that a force applied thereto will urge said first lever to pivot in a direction opposite to the direction of pivot caused by said actuable means, and an arm extending from said second lever to engage said abutment surface when the brake shoe connected to said first lever is tightened against a brake drum.

9. In a brake, a pair of brake shoes to engage a brake drum, first and second levers mounted pivotally at spaced apart points, means to connect one of said pair of brake shoes to said first lever, means to connect the other of said pair of brake shoes to said second lever, actuable means connected to said first and second levers to pivot said levers relative to each other about their respective pivotal mountings to move said pair of brake shoes into engagement with a brake drum, a compression link between said pair of brake shoes, a first abutment surface on said first lever in a plane so that a force applied thereto will urge said first lever to pivot in a direction opposite to the direction of pivot caused by said actuable means, a first arm extending from said second lever to engage said first abutment surface, and a second arm extending from said first lever to engage said second abutment surface to control the locking tendency of the brake shoes with a brake drum.

10. In a brake as set forth in claim 8 wherein said compression link between said pair of brake shoes is spaced from the center of the brake drum a distance less than 0.5 the radius of the brake drum.

11. In a brake as set forth in claim 9 wherein said compression link between said pair of brake shoes is spaced from the center of the brake drum a distance less than 0.5 the radius of the brake drum.

References Cited in the file of this patent

UNITED STATES PATENTS

| | | |
|---|---|---|
| 2,375,392 | Stelzer | May 8, 1945 |
| 2,382,268 | Stelzer | Aug. 14, 1945 |